United States Patent
Yokoyama et al.

(10) Patent No.: US 10,351,942 B2
(45) Date of Patent: Jul. 16, 2019

(54) HOT-DIP GALVANNEALED HOT-ROLLED STEEL SHEET AND PROCESS FOR PRODUCING SAME

(75) Inventors: Takafumi Yokoyama, Amagasaki (JP); Shigeki Nomura, Nishinomiya (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 0 days.

(21) Appl. No.: 14/390,802

(22) PCT Filed: Sep. 11, 2012

(86) PCT No.: PCT/JP2012/073163
§ 371 (c)(1),
(2), (4) Date: Dec. 24, 2014

(87) PCT Pub. No.: WO2013/150669
PCT Pub. Date: Oct. 10, 2013

(65) Prior Publication Data
US 2015/0140358 A1   May 21, 2015

(30) Foreign Application Priority Data
Apr. 6, 2012 (JP) .................. 2012-087539

(51) Int. Cl.
*C21D 8/02* (2006.01)
*C21D 8/04* (2006.01)
(Continued)

(52) U.S. Cl.
CPC .......... *C23C 2/006* (2013.01); *B32B 15/013* (2013.01); *C21D 8/02* (2013.01); *C21D 8/0426* (2013.01);
(Continued)

(58) Field of Classification Search
USPC ...................... 428/659; 420/8–129
See application file for complete search history.

(56) References Cited

U.S. PATENT DOCUMENTS 6,669,789 B1   12/2003  Edelman et al.
2002/0036035 A1  3/2002  Kashima et al.
(Continued)

FOREIGN PATENT DOCUMENTS

CA  2 801 295   12/2011
EP  1 616 970    1/2006
(Continued)

OTHER PUBLICATIONS

English machine translation of JP 4917186 (Maruyama et al.), JPO, accessed May 27, 2015.*

(Continued)

*Primary Examiner* — Humera N Sheikh
*Assistant Examiner* — Xiaobei Wang
(74) *Attorney, Agent, or Firm* — Clark & Brody

(57) ABSTRACT

In a high strength hot-dip galvannealed hot-rolled steel sheet that has an excellent hole expansibility suitable for a stretch flanging and preferably has a high yield ratio and a tensile strength of at least 650 MPa, a hot-rolled steel sheet used as a base material for plating has a chemical composition comprising: in mass %, C: from at least 0.01 and at most 0.20%; Si: at most 0.50%; Mn: from at least 0.01% to at most 1.30%; P: at most 0.05%; S: at most 0.01%; N: at most 0.01%; Al: at most 0.50%; and Ti: from at least 0.05% to at most 0.50%, and a steel structure consisting of a polygonal ferrite having at least 80 area % and the remainder containing one kind or two or more kinds selected from bainitic ferrite, bainite, pearlite, and cementite.

3 Claims, 1 Drawing Sheet

(51) Int. Cl.
| | |
|---|---|
| C21D 9/46 | (2006.01) |
| C22C 38/00 | (2006.01) |
| C22C 38/08 | (2006.01) |
| C22C 38/16 | (2006.01) |
| C22C 38/18 | (2006.01) |
| C22C 38/28 | (2006.01) |
| C22C 38/02 | (2006.01) |
| C22C 38/04 | (2006.01) |
| C22C 38/06 | (2006.01) |
| C22C 38/12 | (2006.01) |
| C23C 2/00 | (2006.01) |
| C23C 2/06 | (2006.01) |
| C23C 2/28 | (2006.01) |
| C22C 38/14 | (2006.01) |
| C23C 2/02 | (2006.01) |
| C23C 2/40 | (2006.01) |
| B32B 15/01 | (2006.01) |
| C22C 18/04 | (2006.01) |
| C21D 9/48 | (2006.01) |
| C21D 1/20 | (2006.01) |

(52) U.S. Cl.
CPC ............ *C21D 8/0447* (2013.01); *C21D 9/46* (2013.01); *C22C 18/04* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/28* (2013.01); *C23C 2/02* (2013.01); *C23C 2/06* (2013.01); *C23C 2/28* (2013.01); *C23C 2/40* (2013.01); *C21D 1/20* (2013.01); *C21D 8/0263* (2013.01); *C21D 9/48* (2013.01); *C21D 2211/002* (2013.01); *C21D 2211/003* (2013.01); *C21D 2211/005* (2013.01); *C21D 2211/009* (2013.01); *Y10T 428/12799* (2015.01)

(56) References Cited

U.S. PATENT DOCUMENTS

| | | | |
|---|---|---|---|
| 2004/0050461 A1* | 3/2004 | Kami et al. | 148/603 |
| 2013/0087254 A1* | 4/2013 | Funakawa | C21D 6/02 148/537 |

FOREIGN PATENT DOCUMENTS

| | | | |
|---|---|---|---|
| EP | 1 918 396 | | 5/2008 |
| EP | 2 192 205 | | 6/2010 |
| EP | 2 267 175 | | 12/2010 |
| EP | 2554705 | | 2/2013 |
| EP | 2586885 | | 5/2013 |
| EP | 2586886 | | 5/2013 |
| JP | H02-8349 | * | 1/1990 |
| JP | 05-117834 | | 5/1993 |
| JP | 05-331596 | | 12/1993 |
| JP | 06-200351 | | 7/1994 |
| JP | H06-200351 | * | 7/1994 |
| JP | 2001234282 | * | 8/2001 |
| JP | 2002-012947 | | 1/2002 |
| JP | 2002-322539 | | 11/2002 |
| JP | 2003-321732 | * | 11/2003 |
| JP | 2003-321736 | | 11/2003 |
| JP | 2004-043978 | | 2/2004 |
| JP | 3577987 B2 | * | 10/2004 |
| JP | 2007262467 | * | 10/2007 |
| JP | 2009174006 | * | 8/2009 |
| JP | 2012-026032 | | 2/2012 |
| KR | 10-2010-0116679 | | 11/2010 |
| WO | 2009/118945 | | 10/2009 |
| WO | 2010/131303 | | 11/2010 |
| WO | 2011/122030 | | 10/2011 |
| WO | 2011/162412 | | 12/2011 |
| WO | 2011/162418 | | 12/2011 |
| WO | WO 2011/162412 | * | 12/2011 |

OTHER PUBLICATIONS

Wu et al.. "On Achieving a Better Understanding of the Polygonal Ferrite Microstructure in IF Steel Using Image Quality Analysis", Dep't Mat. Sci. Univ. of Pittsburgh.*
English machine translation of JP2003-321732, EPO, accessed Oct. 6, 2017.*
English translation of JPH02-8349, EPO, accessed Jan. 17, 2018.*
English machine translation of JP2001-234282, EPO, accessed Feb. 22, 2018.*
English machine translation of JP3577987, EPO, accessed Feb. 22, 2018.*

* cited by examiner

HOT-DIP GALVANNEALED HOT-ROLLED STEEL SHEET AND PROCESS FOR PRODUCING SAME

TECHNICAL FIELD

The present invention relates to a hot-dip galvannealed hot-rolled steel sheet and a process for producing the same. More particularly, the present invention relates to a high strength hot-dip galvanized hot-rolled steel sheet which is suitable for an automobile steel sheet, in particular a chassis (suspension) part of an automobile to be formed into various shapes by a press forming or the like and which is excellent in a hole expansibility, and a process for producing the same.

BACKGROUND ART

A hot-rolled steel sheet produced in a comparatively inexpensive way is widely used for various industrial equipment including an automobile and others. Since in recent years, from the viewpoint of regulating an amount of emission of carbon dioxide in order to take measures against global warming, an improvement in the fuel efficiency of an automobile has been required, a high strength hot-rolled steel sheet has been widely applied to the automobile so as to reduce the weight of a vehicle body and to secure a crashworthiness. Further, here recently, a high strength hot-dip galvannealed hot-rolled steel sheet for which a high strength hot-rolled steel sheet is a base steel sheet has been demanded for a chassis part such as a suspension arm which requires especially a corrosion resistance.

In a steel sheet adopted as an automobile part, not only strength but also various working properties, which are required when a part is formed, such as press formability and weldability also need to be satisfied. As to the press forming of the chassis part, a stretch flanging and a barring are extremely frequently used and hence the high strength hot-dip galvannealed hot-rolled steel sheet supplied for producing the chassis part is required to have an excellent hole expansibility.

Further, there is a case where the high strength steel sheet is applied for a part of which a high crashworthiness is required and for a part which needs to avoid plastic deformation when a large load is applied thereto. In such case, the high strength steel sheet is required to have a high yield ratio. Hence, there is a case where also the high strength hot-dip galvannealed hot-rolled steel sheet is required to have the high yield ratio.

In general, in the high strength hot-dip galvannealed hot-rolled steel sheet, in order to satisfy both of the high yield ratio and the excellent hole expansibility, a steel structure of a single phase structure tends to have ferrite, bainitic ferrite, or bainite as a main phase, and finely precipitate carbide of Ti, Nb, V or the like and Cu to thereby uniformly strengthen the main phase. For examples, the high strength hot-dip galvannealed hot-rolled steel sheets have been developed as shown below.

In a Patent Document 1 discloses a high strength hot-dip galvannealed hot-rolled sheet which has a steel structure mainly comprising bainite and which has the contents of not only Ti, Nb, V but also P, Cu, Cr, Mo, Ni suitably controlled, thereby being improved in a fatigue resistance property of a welded portion under a corrosive environment. However, this steel sheet needs to have a large amount of expensive alloying elements such as Cu, Ni, Mo added thereto and hence is not suitable for a mass production from the perspective of economy. Further, the steel sheet may have the slightly poor hole expansibility.

Patent Document 2 discloses a high strength hot-dip galvannealed hot-rolled steel sheet in which a hot-rolled steel sheet having a (ferrite+bainite) structure is subjected to a thermal history of an optimum hot-dip galvannealing process to suitably control a structure, the shape of carbide, and solid solution C, thereby being improved in the hole expansibility. However, in more than 650 MPa of a tensile strength of a product made of this steel sheet is, the product cannot have a sufficient hole expansibility.

Document 3 discloses a hot-dip galvanized hot-rolled steel sheet in which a steel structure substantially comprising a single phase of ferrite has Ti carbide finely dispersed, the Ti carbide containing Mo and/or W. However, this steel sheet needs to have extremely expensive alloying element such as Mo and W added thereto and hence is not suitable for the mass production from the perspective of economy.

Document 4 discloses a hot-dip galvanized hot-rolled steel sheet in which a structure mainly comprising ferrite and having a dispersion state of pearlite and cementite optimally controlled has Nb, V, Ti added thereto to increase precipitation strengthening, thereby being improved in the hole expansibility. However, in at least 650 MPa of a high strength of the steel sheet, it is possible that the steel sheet does not have a sufficient hole expansibility.

CITATION LIST

Patent Document

Patent Document 1: Japanese Patent Laid-Open No. 5-331596
Patent Document 2: Japanese Patent Laid-Open No. 5-117834
Patent Document 3: Japanese Patent Laid-Open No. 2003-321736
Patent Document 4: Japanese Patent Laid-Open No. 2002-12947

SUMMARY OF INVENTION

An objective of the present invention is to provide a high strength hot-dip galvanized hot-rolled steel sheet which has an excellent hole expandability suitable for a stretch flanging widely used for forming an automobile part and, in particular, a chassis part and which preferably has a high yield ratio, and a process for producing the high strength hot-dip galvanized hot-rolled steel sheet.

The present inventors first assumed that a steel structure should mainly comprise ferrite in order to achieve an excellent hole expansibility and a high yield ratio in addition. Further, the present inventors paid attention to Ti, which is comparatively inexpensive and increases remarkably precipitation strengthening even by a small amount of addition, and earnestly studied a method for improving a hole expansibility of a Ti-added hot-dip galvannealed hot-rolled steel sheet having a structure mainly comprising ferrite. As a result, the present inventors have obtained the following findings.

The present inventors have found that the hole expansibility of a Ti-added high strength hot-dip galvannealed hot-rolled steel sheet, which mainly comprises ferrite and to which Ti is added, can be remarkably increased by facilitating a ferrite transformation in a high temperature range of at least not less than 650° C. on a run out table after hot rolling. It is thought that this is because coherent precipitate of Ti carbide produced in a low temperature range after coiling of the hot-rolled steel sheet is restrained.

Further, the present inventors have found that the above-described result can be achieved by greatly reducing an Mn content as compared with an conventional steel, although it has been thought that a particular amount of Mn is essential for achieving a high strength in a high strength hot-dip galvannealed hot-rolled steel sheet.

Further, the present inventors have found that a reduction in the Mn content exhibits not only the effects described above but also the effects of restraining austenitizing during a period in which the hot-rolled steel sheet is being reheated in a continuous hot-dip galvannealing line and an incidental composite structure, which are achieved by homogenization of a steel structure due to a reduction in Mn micro-segregation and expansion of a ferrite area and hence is extremely effective for improving the hole expansibility. By combination of these effects, the present inventors have successfully obtained an excellent hole expansibility surpassing an conventional Ti-added high strength hot-dip galvannealed hot-rolled steel sheet.

The present invention based on the findings described above is a hot-dip galvannealed hot-rolled steel sheet having a hot-dip galvannealed layer on a surface of a steel sheet, the steel sheet having a chemical composition comprising, in mass %, C: at least 0.01 and at most 0.20%; Si: at most 0.50%; Mn: at least 0.01% and at most 1.30%; P: at most 0.05%; S: at most 0.01%; N: at most 0.01%; Al: at most 0.50%; and Ti: at least 0.05% and at most 0.50%, and a steel structure containing a polygonal ferrite having at least 80 area % and the remainder consisting of one kind or two or more kinds selected from bainitic ferrite, bainite, pearlite, and cementite, wherein the hot-dip galvannealed hot-rolled steel sheet has a mechanical property of at least 650 MPa of a tensile strength.

The preferable aspects of the present invention are as follows:
the chemical composition further comprises one element or two or more elements selected from in mass %, Cr: at most 0.80%; Ni: at most 0.50%; Cu: at most 0.50%; Mo: at most 0.50%; and B: at most 0.0050%,
the chemical composition further comprises one element or two elements selected from in mass %, V: at most 0.5%; and Nb: at most 0.1%,
the chemical composition further comprises of one element or two elements selected from in mass %, Ca: at most 0.01%; and Bi: at most 0.01%, and
the hot-dip galvannealed hot-rolled steel sheet has the mechanical property in which a product of a limiting hole expansion ratio and a tensile strength is at least 60,000 MPa·%, the hole expandability being obtained by a hole expanding test specified by the Japan Iron and Steel Federation Standards, and in which a yield ratio is at least 80%, the yield ratio being a ratio of 0.2 proof stress to the tensile strength.

The present invention also provides a process for producing a hot-dip galvannealed hot-rolled steel sheet, the process comprising the following steps (A) to (C):

(A) a hot rolling step comprising the steps of:
after heating a slab having the chemical composition to a temperature of at least 1100° C. and at most 1350° C., subjecting the slab to hot rolling; completing the hot rolling within a temperature range of at least 850° C. and at most 980° C. to thereby produce a hot-rolled steel sheet; subjecting the hot-rolled steel sheet to a primary cooling treatment, a holding treatment, and a secondary cooling treatment in sequence, the primary cooling treatment cooling the hot-rolled steel sheet to a temperature range of at least 650° C. and at most 800° C. by a water cooling unit, the holding treatment holding the hot-rolled steel sheet for a period of at least Δt seconds defined by the following formula in a temperature range of at least 650° C. and at most 800° C., the secondary cooling treatment cooling the hot-rolled steel sheet to a temperature range of at least 400° C. and at most 650° C.; and coiling the hot-rolled steel sheet in a temperature range of at least 400° C. and at most 650° C., $$\Delta t(\text{second}) = 5 \cdot \text{Mn}^4 \tag{1}$$

where Mn in the formula (1) means a Mn content (unit: mass %) in steel, (B) a pickling step for subjecting the hot-rolled steel sheet produced by the hot rolling step to a pickling treatment; and (C) a continuous hot-dip galvanizing step comprising the steps of: heating the hot-rolled steel sheet produced by the pickling step to a temperature range of at least 650° C. and at most 800° C.; then cooling and subjecting the hot-rolled steel sheet to a hot-dip galvanizing treatment; and further holding the hot-rolled steel sheet in a temperature range of at least 460° C. and at most 600° C. to thereby subject the hot-rolled steel sheet to an alloying treatment.

According to the present invention, it is possible to produce a hot-dip galvannealed hot-rolled steel sheet having a high strength and an excellent hole expansibility that can be produced at the appropriate cost for a mass production. The hot-dip galvannealed hot-rolled steel sheet according to the present invention has the hole expansibility adequate to be applied to a stretch flanging and a barring and hence can be used widely industrially, in particular, in an automobile field.

DESCRIPTION OF EMBODIMENTS

Figure 1:
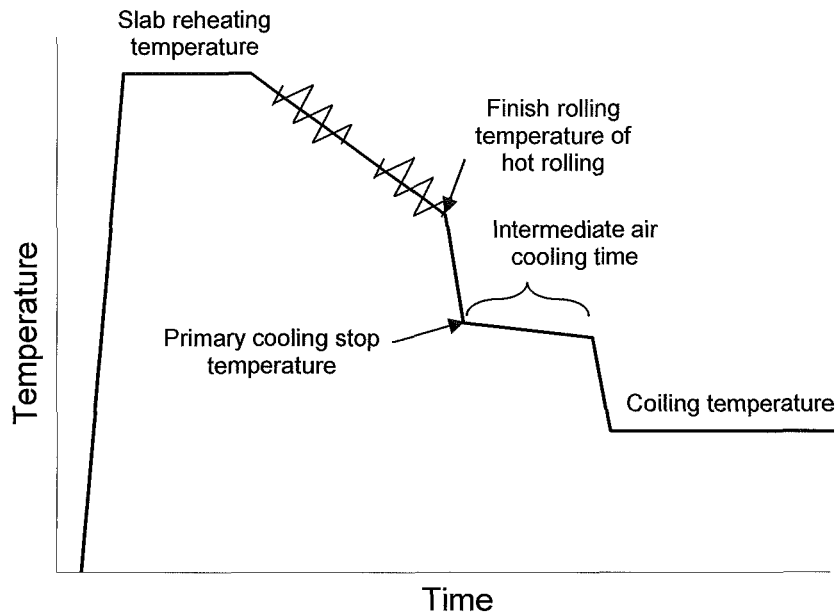
FIG. 1 shows a heat pattern (thermal history) in a hot rolling step employed in an example.

An alloyed hot-dip galvannealed hot-rolled steel sheet according to the present invention will be described in more detail. In the present specification, any symbol "%" to define a chemical composition of steel is "a mass %".

1. Chemical Composition of Steel Sheet

A chemical composition of a steel sheet that is a plating base material of the hot-dip galvannealed hot-rolled steel sheet according to the present invention is as follows.

[C: at Least 0.01% and at Most 0.20%]

C has the effect of improving the strength of the steel sheet. If a C content is less than 0.01%, it is difficult for the steel sheet to obtain a tensile strength of at least 650 MPa. Hence, the C content is made at least 0.01%, and preferably at least 0.05%. On the other hand, if the C content is more than 0.20%, hole expandability and weldability of the steel sheet are extremely deteriorated. Hence, the C content is made at most 0.20% and, preferably, at most 0.12%.

[Si: at Most 0.50%]

Si is a solid solution strengthening element and has a function of enhancing the strength of the steel sheet. However, if an Si content is more than 0.50%, wettability of the steel sheet to a hot-dip galvanizing liquid is extremely deteriorated. Hence, the Si content is made at most 0.50%, and preferably at most 0.20%, and still more preferably, at most 0.10%. In order to obtain an effect by the function described above, it is preferable that the Si content is at least 0.001%.

[Mn: at Least 0.01% and at Most 1.30%]

Mn has a function to fix S which can cause hot brittleness as MnS to avoid the hot brittleness caused by S. When an Mn content is less than 0.01%, it is difficult for the steel sheet to obtain the effect caused by the function described above. Hence, the Mn content is made at least 0.01%, and preferably at least 0.1%. On the other hand, when the Mn content is more than 1.30%, a ferrite transformation temperature is lowered, which hence makes it difficult for the hole expansibility to be enhanced by facilitating a ferrite transformation in a high temperature range of at least 650° C. Hence, the Mn content is made at most 1.30% and, preferably, at most 0.8%.

[P: at Most 0.05%]

P is an element contained generally as an impurity. However, P is a solid solution strengthening element and has an function of enhancing the strength of the steel sheet, so P may be actively contained. However, if a P content is more than 0.05%, weldability and toughness of the steel sheet is extremely deteriorated. Hence, the P content is made at most 0.05% and preferably at most 0.02%.

[S: at Most 0.01%]

S is an element contained generally as an impurity and forms MnS in the steel and deteriorates the stretch flangeability. If the S content is more than 0.01%, the stretch flangeability of the steel sheet is extremely deteriorated. Hence, the S content is made at most 0.01%, and preferably at most 0.005%, and more preferably, at most 0.002%.

[N: at Most 0.01%]

N is an element generally contained as an impurity. If an N content is more than 0.01%, N forms coarse nitride in the steel and extremely deteriorates the stretch flangeability. Hence, the N content is made at most 0.01%, and preferably at most 0.005%.

[Al: at Most 0.50%]

Al has a function to deoxidize the steel to increase the soundness of the steel sheet. However, even if the steel sheet contains Al of more than 0.50%, the effect caused by the function described above is saturated and a cost push is just caused. Hence, the Al content is made at most 0.50%, and preferably, at most 0.20%, and more preferably, at most 0.10%. In order to obtain the effect caused by the function described above, it is preferable that the Al content is made at least 0.001%. The Al content in the steel means the content of acid soluble Al (sol. Al).

[Ti: at Least 0.05% and at Most 0.50%]

Ti is an important element in the present invention and has a function to form carbide in the steel and strengthen ferrite uniformly. If a Ti content is less than 0.05%, it is difficult for the steel sheet to obtain the effect caused by the function described above. Hence, the Ti content is made at least 0.05%, and preferably at least 0.10%. On the other hand, even if the Ti content is made more than 0.50%, the effect caused by the function described above is saturated and a cost push is just caused. Hence, the Ti content is made at most 0.50% and preferably, at most 0.30%.

In addition to the elements described above, the hot-rolled steel sheet of the plating base material may further contain arbitrary elements to be described below.

[One Element or Two or More Elements Selected from Cr: at Most 0.80%; Ni: at Most 0.50%; Cu: at Most 0.50%; Mo: at Most 0.50%; and B: at Most 0.0050%]

Each of Cr, Ni, Cu, Mo, and B is an element which has a function of improving the hardenability of the steel and which is effective in improving the strength of the steel sheet. Hence, the steel sheet may contain one element or two or more elements of these elements. However, if the contents of these elements are excessive, a ferrite transformation temperature is lowered similar to Mn and hence it is difficult for the steel sheet to improve the hole expansibility which can be improved by facilitating a ferrite transformation in a high temperature range of at least 650° C. Hence, the contents of these elements are made those described above. Here, B is especially strong in a function of increasing a hot rolling load, so a B content is preferably at most 0.0009% from the viewpoint of productivity. In this regard, in order to more surely obtain the effect caused by the operation described above, any one of conditions of: Cr: at least 0.001%; Ni: at least 0.001%; Cu: at least 0.001%; Mo: at least 0.001%; and B: at least 0.0001% is preferably satisfied.

[One Element or Two Elements Selected from V: at Most 0.5%; and Nb: at Most 0.1%]

Each of V and Nb has a function to form carbide in the steel and strengthen ferrite uniformly similar to Ti. Although V and Nb are elements more expensive than Ti, one or two or more elements of these elements may be contained. However, even if V of more than 0.5% is contained or even if Ni of more than 0.1% is contained, the effect caused by the function described above is saturated and a cost push is just caused. Hence, a V content is made at most 0.5% and a Nb content is made at most 0.1%. In this regard, in order to more surely obtain the effect caused by the function described above, either of the elements of less than 0.001% is preferably contained.

[One Element or Two Elements Selected from Ca: at Most 0.01%; and Bi: at Most 0.01%]

Ca has an function to finely disperse inclusions in the steel and Bi has an function to reduce the micro segregation of a substitutional alloy element such as Mn and Si in the steel, so both of Ca and Bi have the function of improving the hole expansibility of the steel sheet. Hence, one element or two elements of Ca and Bi may be contained. However, if the content of either element is more than 0.01%, ductility is deteriorated. Hence, the content of either element is made at most 0.01%. In this regard, in order to surely obtain the effect caused by the function described above, either of the elements is preferably at least 0.0001%.

In this regard, $C^*$ defined by the following equation (2) it preferably satisfies the following equation (3). In this way, the steel sheet can have a more excellent hole expandability.

$$C^* = C - 12.01 \times \{Ti/47.88 + Nb/92.91 + 0.5 \times V/50.94\} \quad (2)$$

$$-0.020 \leq C^* \leq 0.050 \quad (3)$$

Here, $C^*$ means the amount of C not fixed in the steel other than C existing as carbide (TiC, NbC, VC, (Ti, V) C, (Ti, Nb) C, (Ti, Nb, V) C) containing Ti, Nb, and V in the amount of C in the steel. Further, Ti, Nb, and V in the equation (2) shows the contents of the respective elements in the steel (unit: mass %).

By making $C^*$ at least −0.020%, it is possible to suppress the exhaustion of C in a ferrite grain boundary and hence to improve the hole expansibility. It is more preferable that $C^*$ is at least 0.010%. On the other hand, by making $C^*$ at most 0.050%, it is possible to suppress formation of a second phase such as cementite and pearlite and hence to improve the hole expansibility. It is more preferable that $C^*$ is made at most 0.030%.

2. Steel Structure of Steel Sheet

The hot-rolled steel sheet that is the plating base material of the hot-dip galvannealed hot-rolled steel sheet according to the present invention has a steel structure containing polygonal ferrite having at least 80% area % and the remainder comprising one or two or more kinds selected from bainitic ferrite, bainite, pearlite, and cementite.

In order to achieve the excellent hole expandability and a high yield ratio, the hot-rolled steel sheet has the steel structure mainly comprising polygonal ferrite. If an area fraction of the polygonal ferrite of a main phase is less than 80%, it is difficult for the hot-rolled steel sheet to achieve an excellent hole expandability. Further, it is also difficult for the steel sheet to achieve an excellent ductility. Hence, the area fraction of the polygonal ferrite is made at least 80%. The area fraction is preferably at least 90%, and more preferably at least 95%. The upper limit of the area fraction of the polygonal ferrite is not defined but is preferably at most 99.9%. More preferably, the upper limit of the area fraction of the polygonal ferrite is at most 99.5% and especially preferably at most 99%.

Martensite and retained austenite greatly deteriorate the hole expansibility and also reduce the yield ratio. Hence, a remaining structure excluding the polygonal ferrite does not contain the martensite and the retained austenite but contains one kind or two or more kinds selected from the bainitic ferrite, the bainite, the pearlite, and the cementite. The ratio of these phases and structures is not limited to a particular ratio. Generally, the remaining structure contains the cementite and further contains the bainitic ferrite in some cases. However, the remaining structure is not necessarily limited to the structures.

The area fraction of the steel structures is found by observing a section of the steel sheet indicating a typical structure of the steel sheet, the section being at a position of a depth of ¼ of a sheet thickness from a surface of the steel sheet.

3. Mechanical Properties of Hot-dip Galvannealed Hot-rolled Steel Sheet

A steel sheet having a tensile strength of less than 650 MPa hardly meats needs for higher strength in recent years. Hence, the hot-dip galvannealed hot-rolled steel sheet according to the present invention has a mechanical property of a tensile strength of at least 650 MPa. The tensile strength is preferably at least 680 MPa, and more preferably at least 700 MPa, and still more preferably at least 750 MPa.

In this regard, as described above, a high-strength hot-dip galvannealed hot-rolled steel sheet is required to have an excellent hole expansibility, so that it is preferable that the high-strength hot-dip galvannealed hot-rolled steel sheet has a mechanical property in which a product of a limiting hole expansion ratio which is found according to a hole expansibility test specified by JFS (The Japan Iron and Steel Federation Standards) T1001, and a tensile strength is at least 60,000 MPa·%. The product of the limiting hole expansion ratio and the tensile strength becomes an index of the balance of strength–formability in the stretch flangeability. The limiting hole expansion ratio itself is preferably at least 70% and more preferably at least 75%.

Further, as described above, in the case that a high-strength hot-dip galvannealed hot-rolled steel sheet is applied to a part which needs to avoid the plastic deformation, the high-strength hot-dip galvannealed hot-rolled steel sheet may also be required to have a high yield ratio. Hence, the high-strength hot-dip galvannealed hot-rolled steel sheet more preferably has a mechanical property in which a yield ratio which is a ratio of 0.2% proof stress to the tensile strength is at least 80%. The yield stress is especially preferably at least 85%.

4. Hot-dip Galvannealed Layer

A hot-dip galvannealed layer is not especially limited but is similar to a galvanized layer in a conventional hot-dip galvannealed hot-rolled steel sheet. A coating weight of the hot-dip galvannealed layer and a Fe concentration will be described in the description relating to the following production method.

5. Production Method

The hot-dip galvannealed hot-rolled steel sheet according to the present invention is produced by a method including (A) a hot rolling step, (B) a pickling step, and (C) a continuous hot-dip galvanizing step. Production conditions will be described for each of the steps.

(A) Hot Rolling Process

[Slab Reheating Temperature: at Least 1100° C. and at Most 1350° C.]

A slab heating temperature when a slab having the chemical composition described above is subjected to hot rolling is made at least 1100° C. and at most 1350° C. In order to achieve the high strength and the excellent hole expansibility in a final product, elements such as Ti, Nb, and V for forming carbide needs to be provided in the solid solution state during the hot rolling. If the slab reheating temperature is less than 1100° C., the elements are not provided in the solid solution state and hence coarse carbide is formed, which makes it difficult to achieve a desired strength in a final product. Hence, the slab reheating temperature is made at least 1100° C. On the other hand, if the slab heating temperature is more than 1350° C., not only the effect described above is saturated but also the scale loss is increased, which hence results in disadvantages in the cost. Hence, the slab heating temperature is made at most 1350° C.

[Finish Rolling Temperature of Hot Rolling: at Least 850° C. and at Most 980° C.]

If a finish rolling temperature of hot rolling is less than 850° C., a deformation resistance of the slab is excessively increased, which makes it difficult to roll the slab. Hence, the finish rolling temperature of hot rolling is made at least 850° C. On the other hand, if the finish rolling temperature of hot rolling is more than 980° C, a ferrite grain after cooling is made coarse, which makes it difficult to achieve a desired strength in a final product. Hence, the finish rolling temperature of hot rolling is made at most 980° C.

[Primary Cooling Stop Temperature: at Least 650° C. and at Most 800° C.]

After the hot rolling described above, a primary cooling treatment is performed by a water cooling unit. If a primary cooling stop temperature is less than 650° C., carbide coherent to ferrite parent phase, which makes it difficult to achieve an excellent hole expansibility in a final product. Hence, the primary cooling stop temperature is made at least 650° C. On the other hand, if the primary cooling stop temperature is more than 800° C., the carbide precipitated in the ferrite is made excessively coarse, which makes it difficult to secure the desired strength in the final product. Hence, the primary cooling stop temperature is made at most 800° C. In this regard, a primary cooling rate is not especially defined but is preferably made at least 10° C./sec and less than 200° C./sec from the restriction of an actual water cooling unit.

[Holding Time in Temperature Range of at Least 650° C. and at Most 800° C.: at Least $\Delta t$ (Second)]

$\Delta t(\text{second}) = 5 \cdot Mn^4$ (Mn: Mn content (mass %) in steel)

A hot-rolled steel sheet obtained by the primary cooling treatment is held for a period of at least $\Delta t$ (second) defined as a function of the Mn content in a temperature range of at least 650° C. to at most 800° C. A specific aspect of holding may be achieved by keeping heat or heating but preferably is achieved by air cooling from a perspective of productivity. Hence, a holding time will be also referred to as "an intermediate air cooling time" in the following.

If the holding time is less than Δt (second), polygonal ferrite cannot be sufficiently formed in some cases, which hence makes it difficult to achieve an excellent hole expansibility in the final product. An upper limit of the holding time does not need to be especially specified but is preferably made at least 30 seconds from a perspective of productivity.

[Secondary Cooling Stop Temperature/Coiling Temperature: at Least 400° C. and at Most 650° C.]

After the holding treatment described above, the hot-rolled steel sheet is subjected to a secondary cooling treatment by a water cooling unit and then is coiled, thereby being brought into a hot-rolled coil. If a secondary cooling stop temperature and a coiling temperature are more than 650° C., Ti carbide is made excessively coarse while the hot-rolled steel sheet is being coiled, which makes it difficult to achieve the desired strength in the final product. Hence, the secondary cooling stop temperature and the coiling temperature are made at most 650° C. On the other hand, if the secondary cooling stop temperature and the coiling temperature are less than 400° C., the interior of the hot-rolled coil is non-uniformly cooled and hence a variation in properties in the coil is made significant, which hence decrease the yield in some cases. Hence, the secondary cooling stop temperature and the coiling temperature are made at least 400° C. In this regard, a secondary cooling rate is not especially specified but is preferably made at least 10° C./sec and less than 200° C./sec from the restriction of an actual water cooling unit.

It is recommended to perform the hot rolling step according to a conventional method except for the conditions described above. For example, it is recommended to make the slab for the hot rolling by melting steel having the chemical composition described above and then by continuously casting the steel or by casting and blooming. A continuous casting step is preferably employed from a perspective of productivity. Further, in the case of employing the continuous casting step, in order to improve cracking resistance by controlling inclusions, it is preferable to stir molten steel in a mold by using an external magnetic field or a mechanical stirring unit. The slab produced in this way may be subjected directly to the hot rolling or may be thermally held or be reheated and then be subjected to the hot rolling.

The hot rolling step is usually performed in multiple passes. It is preferable that a rolling reduction per one pass is at least 10% and at most 60%. If the rolling reduction per one pass is at least 10%, much strain can be introduced into austenite and hence the crystal grains of ferrite produced by transformation can be made fine and hence the structure of the hot-rolled steel sheet is refined, which can more improve the ductility and the hole expansibility. Further, if the rolling reduction per one pass is made at most 60%, the formation of a texture caused by unrecrystallized austenite can be suppressed, which can still more improve the ductility and the hole expandability. The thickness of the hot-rolled steel sheet may be set according to the use but usually ranges from 1.6 mm to 4.5 mm.

(B) Pickling Step

The hot-rolled steel strip produced by the hot rolling step is subjected to a pickling treatment in a pickling step so as to remove scale. It is recommended to perform the pickling treatment according to an ordinary method. Before or after the pickling step, in order to flatten or straighten the hot-rolled steel sheet and to facilitate the removal of the scale, it is also recommended to subject the hot-rolled steel sheet to a skin-pass rolling. An elongation percentage in the case that the hot-rolled steel strip is subjected to the skin-pass rolling is not especially specified at a particular value but is preferably at least 0.1% and less than 3.0%.

(C) Continuous Hot-dip Galvanizing Step

The hot-rolled steel sheet pickled by the pickling step is subjected to a continuous hot-dip galvanizing step for performing treatments of heating, hot-dip galvanizing, and alloying in sequence, whereby a hot-dip galvannealed hot-rolled steel sheet is produced.

[Maximum Heating Temperature: at Least 650° C. and at Most 800° C.]

In a continuous hot-dip galvanizing line, the hot-rolled steel sheet is subjected to an annealing treatment before the hot-rolled steel sheet is subjected to a hot-dip galvanizing treatment so as to achieve an excellent platability. An ordinary in-line annealing unit includes at least an oxidation furnace (or non-oxidation oxidation furnace having a weakly oxidizing property) and a reducing furnace. By this annealing treatment, the surface of the hot-rolled steel sheet is oxidized and reduced, thereby being activated. If a maximum heating temperature is less than 650° C., the surface of the hot-rolled steel sheet cannot be sufficiently oxidized and reduced and hence the platability is deteriorated. Hence, the maximum heating temperature is made at least 650° C. On the other hand, if the maximum heating temperature is more than 800° C., austenitizing of the hot-rolled steel sheet is promoted and hence deteriorates the strength. Hence, the maximum heating temperature is made at most 800° C. A holding time in a temperature range of at least 650° C. and at most 800° C. is not especially specified but it is preferable to hold the hot-rolled steel sheet for a holding time of at least 10 seconds to at most 200 seconds.

After heating the hot-rolled steel sheet to the maximum heating temperature, the hot-rolled steel sheet is cooled to a temperature range near a bath temperature of a hot-dip galvanizing bath for hot-dip galvanized treatment. A cooling rate at that time is not especially specified but it is preferable to set the cooling rate at a value of at least 1° C./sec to at most 50° C./sec from the restriction of an actual cooling unit. Further, it is preferable to make a cooling stop temperature at least 400° C. to at most 550° C.

The hot-rolled steel sheet cooled to the temperature range is dipped in the hot-dip galvanizing bath, thereby being subjected to a hot-dip galvanizing treatment. It is recommended to perform the hot-dip galvanizing treatment by an ordinary method. For example, it is recommended to perform the hot-dip galvanizing treatment under the following hot-dip galvanizing conditions: temperature of galvanizing bath=at least 420° C. and at most 500° C.; temperature of steel sheet to be dipped=at least 420° C. to at most 500° C.; and dipping time=at most 5 seconds. It is preferable that the hot-dip galvanizing bath has a composition containing Al of at least 0.08 mass % and at most 0.2 mass %. In addition, even if the galvanizing bath contains Fe, Si, Mg, Mn, Cr, Ti and Pb, which are unavoidable impurities, these elements do not affect the present invention. It is preferable that a coating weight is controlled by a well-known method such as a gas wiping method after the hot-rolled steel sheet is dipped in the hot-dip galvanizing bath. It is preferable that the coating weight per one side is made at least 25 mg/m$^2$ and at most 75 g/m$^2$.

[Alloying Treatment Temperature: at Least 460° C. to at Most 600° C.]

If an alloying treatment temperature is less than 460° C., an alloying speed is made excessively slow and hence productivity is deteriorated. Further, there is a case where unevenness is occurred in the alloying treatment. Hence, the alloying treatment temperature is made at least 460° C. On the other hand, if the alloying treatment temperature is more than 600° C., the alloying treatment is excessively promoted and hence the powdering resistance of the steel sheet significantly deteriorates. Hence, the alloying treatment temperature is made at most 600° C. An alloying treatment time is not especially specified but is preferably made 5 to 60 seconds.

Although an Fe concentration in the hot-dip galvannealed layer is different depending on the alloying heat treatment conditions and the coating weight, it is preferable that the Fe concentration ranges from 7 to 14 mass %.

After the hot-rolled steel sheet is passed through the hot-dip galvannealing line, in order to flatten and straighten the steel strip and to control the surface roughness of the steel sheet, the steel sheet may be subjected to a temper rolling. In this case, in order to avoid decrease of ductility of the steel sheet, it is preferable that an elongation percentage is made at most 2%.

EXAMPLE

Steel having a chemical composition shown in Table 1 was melted in a laboratory and was cast into a steel ingot and then a steel slab was obtained by forging the steel ingot. Next, the obtained steel slab was hot-rolled by a hot rolling unit for test under heating and cooling conditions shown in Table 2, whereby a hot-rolled steel sheet having a thickness of 3.2 mm was obtained. A heat pattern in the hot rolling is shown in FIG. 1. Temperatures at respective points are surface temperatures measured by a radiation thermometer. A cooling rate in a primary cooling and a secondary cooling, which were performed by water cooling, was approximately 40° C./sec.

Figure 2:
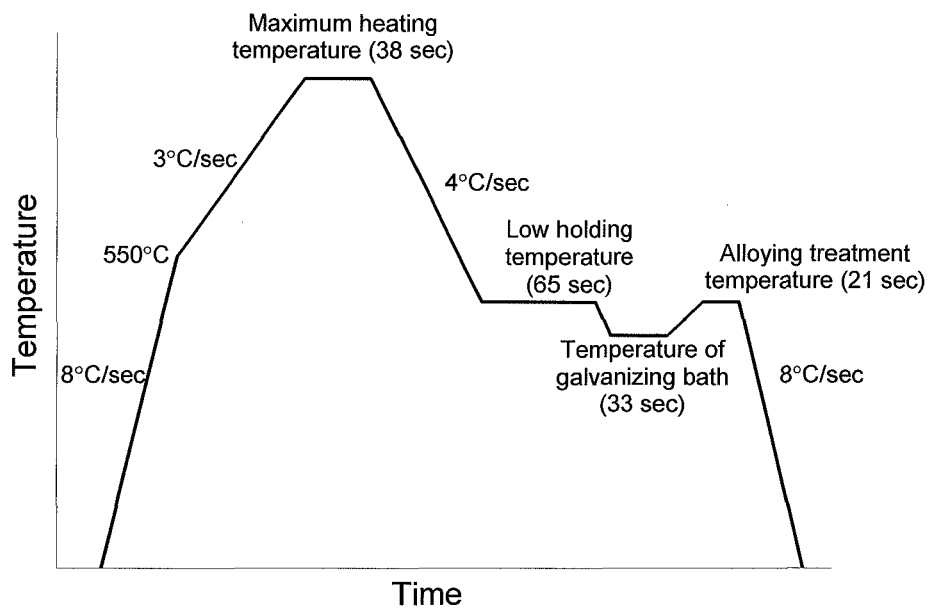
FIG. 2 shows a heat pattern in a continuous hot-dip galvanizing step employed in the example.

The hot-rolled steel sheet cooled to a room temperature was subjected to a pickling treatment using an ordinary hydrochloric acid pickling liquid as a descaling treatment. Then, the hot-rolled steel sheet was not subjected to a cold rolling but was subjected to a heat treatment simulating a hot-dip galvannealing line shown in FIG. 2 under conditions shown in Table 2 by using a continuous heat treatment simulator.

TABLE 1

| Kind of steel | Chemical composition (unit: mass %, the remainder: Fe and impurities) | | | | | | | | | | |
|---|---|---|---|---|---|---|---|---|---|---|---|
| | C | Si | Mn | P | S | Al | Ti | Other elements | N | C* | Note |
| A | 0.066 | 0.01 | 0.49 | 0.012 | 0.002 | 0.049 | 0.19 | | 0.0036 | 0.018 | Example of invention |
| B | 0.065 | 0.02 | 0.99 | 0.011 | 0.002 | 0.043 | 0.15 | | 0.0037 | 0.027 | Example of invention |
| C | 0.063 | 0.01 | 1.49 | 0.011 | 0.002 | 0.044 | 0.15 | | 0.0033 | 0.025 | Comparative example |
| D | 0.105 | 0.01 | 0.49 | 0.011 | 0.002 | 0.047 | 0.19 | V: 0.24 | 0.0036 | 0.029 | Example of invention |
| E | 0.061 | 0.03 | 0.54 | 0.010 | 0.001 | 0.048 | 0.11 | V: 0.12 | 0.0035 | 0.019 | Example of invention |
| F | 0.068 | 0.01 | 0.55 | 0.012 | 0.002 | 0.049 | 0.15 | Nb: 0.03 | 0.0036 | 0.026 | Example of invention |
| G | 0.066 | 0.4 | 0.49 | 0.012 | 0.002 | 0.049 | 0.19 | | 0.0036 | 0.018 | Example of invention |
| H | 0.069 | 0.02 | 0.52 | 0.010 | 0.001 | 0.055 | 0.15 | Cu: 0.25 | 0.0033 | 0.031 | Example of invention |
| I | 0.063 | 0.03 | 0.56 | 0.014 | 0.002 | 0.051 | 0.17 | Cr: 0.16 | 0.0031 | 0.020 | Example of invention |
| J | 0.066 | 0.02 | 0.48 | 0.015 | 0.001 | 0.048 | 0.16 | Ni: 0.18 | 0.0034 | 0.026 | Example of invention |
| K | 0.060 | 0.02 | 0.45 | 0.012 | 0.001 | 0.052 | 0.15 | Mo: 0.14 | 0.0032 | 0.022 | Example of invention |
| L | 0.066 | 0.02 | 0.48 | 0.012 | 0.001 | 0.054 | 0.16 | B: 0.0008 | 0.0028 | 0.026 | Example of invention |
| M | 0.062 | 0.01 | 0.51 | 0.010 | 0.002 | 0.045 | 0.14 | Ca: 0.002 | 0.0030 | 0.027 | Example of invention |
| N | 0.064 | 0.02 | 0.46 | 0.013 | 0.002 | 0.053 | 0.15 | Bi 0.002 | 0.0031 | 0.026 | Example of invention |
| O | 0.075 | 0.03 | 0.51 | 0.013 | 0.001 | 0.045 | 0.03 | | 0.0029 | 0.067 | Comparative example |

C* = C − 12.01 * (Ti/47.88 + Nb/92.91 + 0.5 * V/50.94);
Underline means outside of the range of the present invention

TABLE 2

| | | Hot rolling conditions | | | | | |
|---|---|---|---|---|---|---|---|
| Test No. | Kind of steel | Slab reheating temperature (° C.) | Finish rolling temperature (° C.) | Primary cooling stop temperature (° C.) | Intermediate air cooling time (second) | Δt (second) | Coiling temperature (° C.) |
| 1 | A | 1250 | 880 | 750 | 2 | 0.3 | 580 |
| 2 | A | 1250 | 880 | 730 | 2 | 0.3 | 640 |
| 3 | A | 1250 | 880 | 750 | 2 | 0.3 | 580 |
| 4 | A | 1250 | 880 | 750 | 2 | 0.3 | 580 |
| 5 | A | 1250 | 880 | 750 | 2 | 0.3 | 580 |
| 6 | A | 1250 | 890 | 780 | 10 | 0.3 | 580 |
| 7 | A | 1250 | 900 | 750 | 10 | 0.3 | 580 |
| 8 | B | 1250 | 880 | 750 | 2 | 4.8 | 600 |
| 9 | B | 1250 | 900 | 780 | 10 | 4.8 | 600 |
| 10 | B | 1250 | 900 | 740 | 10 | 4.8 | 630 |
| 11 | C | 1250 | 880 | 740 | 2 | 24.6 | 580 |
| 12 | C | 1250 | 880 | 760 | 2 | 24.6 | 640 |
| 13 | C | 1250 | 900 | 780 | 15 | 24.6 | 600 |
| 14 | D | 1250 | 880 | 750 | 2 | 0.3 | 590 |
| 15 | D | 1250 | 880 | 750 | 2 | 0.3 | 650 |

TABLE 2-continued

| | | | | | | | |
|---|---|---|---|---|---|---|---|
| 16 | D | 1250 | 900 | 790 | 10 | 0.3 | 590 |
| 17 | E | 1250 | 900 | 740 | 10 | 0.4 | 600 |
| 18 | F | 1250 | 890 | 750 | 10 | 0.5 | 600 |
| 19 | G | 1250 | 900 | 730 | 10 | 0.3 | 620 |
| 20 | H | 1250 | 900 | 750 | 10 | 0.4 | 600 |
| 21 | I | 1250 | 900 | 760 | 10 | 0.5 | 610 |
| 22 | J | 1250 | 870 | 740 | 10 | 0.3 | 600 |
| 23 | K | 1250 | 890 | 720 | 10 | 0.2 | 600 |
| 24 | L | 1250 | 900 | 760 | 10 | 0.3 | 600 |
| 25 | M | 1250 | 900 | 740 | 10 | 0.3 | 590 |
| 26 | N | 1250 | 900 | 730 | 10 | 0.2 | 580 |
| 27 | O | 1250 | 900 | 730 | 10 | 0.3 | 590 |

| | Hot-dip galvannealing conditions | | | | |
|---|---|---|---|---|---|
| Test No. | Maximum heating temperature (° C.) | Low holding temperature (° C.) | Galvanizing bath temperature (° C.) | Alloying treatment temperature (° C.) | Note |
| 1 | 750 | 500 | 460 | 500 | Example of invention |
| 2 | 750 | 500 | 460 | 500 | Example of invention |
| 3 | 720 | 500 | 460 | 500 | Example of invention |
| 4 | 780 | 500 | 460 | 500 | Example of invention |
| 5 | 850 | 500 | 460 | 500 | Comparative example |
| 6 | 750 | 500 | 460 | 500 | Example of invention |
| 7 | 750 | 500 | 460 | 500 | Example of invention |
| 8 | 750 | 500 | 460 | 500 | Comparative example |
| 9 | 750 | 500 | 460 | 500 | Example of invention |
| 10 | 750 | 500 | 460 | 500 | Example of invention |
| 11 | 750 | 500 | 460 | 500 | Comparative example |
| 12 | 750 | 500 | 460 | 500 | Comparative example |
| 13 | 750 | 500 | 460 | 500 | Comparative example |
| 14 | 750 | 500 | 460 | 500 | Example of invention |
| 15 | 750 | 500 | 460 | 500 | Example of invention |
| 16 | 750 | 500 | 460 | 500 | Example of invention |
| 17 | 750 | 500 | 460 | 500 | Example of invention |
| 18 | 750 | 500 | 460 | 500 | Example of invention |
| 19 | 750 | 500 | 460 | 500 | Example of invention |
| 20 | 750 | 500 | 460 | 500 | Example of invention |
| 21 | 750 | 500 | 460 | 500 | Example of invention |
| 22 | 750 | 500 | 460 | 500 | Example of invention |
| 23 | 750 | 500 | 460 | 500 | Example of invention |
| 24 | 750 | 500 | 460 | 500 | Example of invention |
| 25 | 750 | 500 | 460 | 500 | Example of invention |
| 26 | 750 | 500 | 460 | 500 | Example of invention |
| 27 | 750 | 500 | 460 | 500 | Comparative example |

JIS No. 5 tensile test specimens were obtained in a direction perpendicular to a rolling direction from the hot-rolled steel sheet subjected to the same thermal history as a hot-dip galvannealing step and were subjected to a tensile test. In the tensile test, a yield stress (0.2% proof stress), a tensile strength, and a total elongation were measured and a yield ratio (yield stress/tensile strength) was calculated for each test specimens. Then, a hole expanding test was performed according to a JFS T 1001 hole expanding test method of the Japan Iron and Steel Federation Standards and a limiting hole expansion ratio, which is a hole expansion ratio when a crack extended through the sheet thickness, was measured and a value of (the tensile strength×the limiting hole expansion ratio) was calculated.

A steel structure was observed in the following manner: a longitudinal cross section of the steel sheet was subjected to a Nital etching; a photograph of the section was taken at a position of a ¼ depth of thickness from the surface by using an optical microscope or a scanning electron microscope; and an area fraction of each of structures was calculated from the photograph by a point counting method. Results obtained in this manner will be shown in Table 3.

TABLE 3

| | | Steel structure | | Mechanical properties | | | | | | |
|---|---|---|---|---|---|---|---|---|---|---|
| Test No. | Kind of steel | Polygonal ferrite (Area %) | Balance | Tensile strength (MPa) | Yield stress (MPa) | Yield ratio (%) | Total elongation (%) | Limiting hole expanstion ratio (%) | Tensile strength X limiting hole expansion ratio (Mpa · %) | Note |
| 1 | A | 98 | BF, θ | 741 | 694 | 93.7 | 18.4 | 95 | 70395 | Example of invention |
| 2 | A | 99 | BF, θ | 761 | 704 | 92.5 | 19.2 | 79 | 60119 | Example of invention |
| 3 | A | 98 | BF, θ | 766 | 710 | 92.7 | 18.3 | 89 | 68174 | Example of invention |
| 4 | A | 98 | BF, θ | 731 | 678 | 92.7 | 19.4 | 85 | 62135 | Example of invention |
| 5 | A | 99 | θ | 601 | 508 | 84.5 | 23.6 | 111 | 66711 | Comparative example |
| 6 | A | 99 | θ | 683 | 599 | 87.7 | 19.6 | 96 | 65568 | Example of invention |
| 7 | A | 99 | θ | 725 | 638 | 88.0 | 22.0 | 103 | 74675 | Example of invention |

TABLE 3-continued

| Test No. | Kind of steel | Steel structure Polygonal ferrite (Area %) | Balance | Mechanical properties Tensile strength (MPa) | Yield stress (MPa) | Yield ratio (%) | Total elongation (%) | Limiting hole expanstion ratio (%) | Tensile strength X limiting hole expansion ratio (Mpa · %) | Note |
|---|---|---|---|---|---|---|---|---|---|---|
| 8 | B | <u>75</u> | BF, θ | 758 | 700 | 92.3 | 19.9 | 53 | 40174 | Comparative example |
| 9 | B | 98 | θ | 697 | 615 | 88.2 | 20.0 | 93 | 64821 | Example of invention |
| 10 | B | 99 | θ | 712 | 623 | 87.5 | 20.4 | 90 | 64080 | Example of invention |
| 11 | <u>C</u> | <u>30</u> | BF, θ, <u>M</u> | 860 | 793 | 92.2 | 19.2 | 43 | 36980 | Comparative example |
| 12 | <u>C</u> | 95 | BF, θ, <u>M</u> | 816 | 739 | 90.6 | 20.8 | 45 | 36720 | Comparative example |
| 13 | <u>C</u> | 55 | BF, θ, <u>M</u> | 834 | 742 | 89.0 | 18.2 | 50 | 41700 | Comparative example |
| 14 | D | 99 | θ | 860 | 792 | 92.1 | 19.4 | 81 | 69660 | Example of invention |
| 15 | D | 99 | θ | 868 | 789 | 90.9 | 18.8 | 79 | 68572 | Example of invention |
| 16 | D | 98 | θ | 787 | 674 | 85.6 | 18.8 | 95 | 74765 | Example of invention |
| 17 | E | 98 | θ | 709 | 621 | 87.6 | 21.0 | 91 | 64519 | Example of invention |
| 18 | F | 95 | BF, θ | 751 | 677 | 90.1 | 20.2 | 83 | 62333 | Example of invention |
| 19 | G | 99 | θ | 760 | 669 | 88.0 | 20.9 | 88 | 66880 | Example of invention |
| 20 | H | 98 | θ | 739 | 643 | 87.0 | 20.5 | 83 | 61337 | Example of invention |
| 21 | I | 93 | BF, θ | 716 | 651 | 90.9 | 19.8 | 85 | 60860 | Example of invention |
| 22 | J | 94 | BF, θ | 738 | 660 | 89.4 | 20.5 | 83 | 61254 | Example of invention |
| 23 | K | 97 | BF, θ | 734 | 658 | 89.6 | 20.2 | 85 | 62390 | Example of invention |
| 24 | L | 96 | BF, θ | 741 | 679 | 91.6 | 18.5 | 90 | 66690 | Example of invention |
| 25 | M | 98 | θ | 711 | 635 | 89.3 | 20.4 | 102 | 72522 | Example of invention |
| 26 | N | 99 | θ | 715 | 627 | 87.7 | 20.8 | 104 | 74360 | Example of invention |
| 27 | <u>O</u> | 91 | P, θ | <u>512</u> | 448 | 87.5 | 31.6 | 120 | 61440 | Comparative example |

BF: bainitic ferrite,
θ: cementite,
P: pearlite,
M: martensite;
Underline means outside of the range of the pesent invention Test No. 1 to 4, 6, 7, 9, 10, 14 to 26 are examples of invention in which all of the chemical composition, the production conditions, and the steel structure corresponded to ranges defined by the present invention and in which desired mechanical properties were achieved.

On the other hand, in test No. 5, the maximum heating temperature in the continuous hot-dip galvanizing step was more than a temperature defined by the present invention and hence a tensile strength was insufficient. In test No. 8, an intermediate air cooling time after stopping the primary cooling did not satisfy the time Δt defined by the present invention and the volume fraction of ferrite was smaller than a range defined by the present invention, so that a strength–hole expansibility balance was deteriorated. In test No. 11 to 13, a Mn content was more than a value defined by the present invention and hence the hole expansibility was deteriorated. In test No. 27, a Ti content did not satisfy a range defined by the present invention and hence a tensile strength was insufficient.

The invention claimed is:

1. A hot-dip galvannealed hot-rolled steel sheet having a hot-dip galvannealed layer on a surface of a hot-rolled steel sheet, characterized by having a chemical composition consisting of, in mass %, C: at least 0.01 and at most 0.20%; Si: at most 0.50%; Mn: at least 0.01% and at most 0.49%; P: at most 0.05%; S: at most 0.01%; N: at most 0.01%; Al: at most 0.50%; Ti: at least 0.14% and at most 0.50%; and at least one element selected from Ni: 0.001 to 0.50%, Cu: 0.001 to 0.50%, V:0.001 to 0.50% and Bi:0.001 to 0.01%, a remainder of Fe and impurities, and optionally one element or two or more elements in mass % selected from Cr: at most 0.80%; Nb: at most 0.1%; Ca: at most 0.01%, and
   by having a steel structure containing a polygonal ferrite having at least 93 area % and the remainder consisting of one kind or two or more kinds selected from bainitic ferrite, bainite, pearlite, and cementite,
   wherein the hot-dip galvannealed hot-rolled steel sheet has a mechanical property of at least 650 MPa of a tensile strength by forming non-coherent Ti carbide in the steel and precipitation-strengthening ferrite, and the hot-dip galvannealed hot-rolled steel sheet has a mechanical property in which a product of a limiting hole expansion ratio and a tensile strength is at least 60000 MPa-% the limiting hole expansion ratio being obtained by a hole expanding test specified by the Japan Iron and Steel Federation Standards JFS T 1001.

2. The hot-dip galvannealed hot-rolled steel sheet as set forth in claim 1, wherein the hot-dip galvannealed hot-rolled steel sheet has a yield ratio of at least 80%, the yield ratio being a ratio of 0.2 proof stress to the tensile strength.

3. A process for producing a hot-dip galvannealed hot-rolled steel sheet having a steel structure containing a polygonal ferrite having at least 93 area % and the remainder consisting of one kind or two or more kinds selected from bainitic ferrite, bainite, pearlite, and cementite, the process comprising the following steps (A) to (C):
   (A) a hot rolling step comprising the steps of: after reheating a slab having a chemical composition consisting of, in mass %, C: at least 0.01 and at most 0.20%; Si: at most 0.50%; Mn: at least 0.01% and at most 0.49%; P: at most 0.05%; S: at most 0.01%; N: at most 0.01%; Al: at most 0.50%; and Ti: at least 0.14% and at most 0.50%, a remainder of Fe and impurities and optionally one element or two or more elements in mass% selected from in mass%, Cr: at most 0.80%; Ni: at most 0.50%; Cu: at most 0.50%; one or two elements in mass% selected from V: at most 0.5%; and Nb: at most 0.1% and one element or two or more elements in mass % selected from Ca: at most 0.01%. and Bi: at most 0.01% to a temperature of at least 1100° C. and at most 1350° C.; subjecting the slab to hot rolling; completing the hot rolling within a temperature range of at least 850° C. and at most 980° C. to thereby produce a hot-rolled steel sheet; subjecting the hot-rolled steel sheet to a primary cooling treatment, a holding treatment, and a secondary cooling treatment in sequence, the primary cooling treatment cooling the hot-rolled steel sheet to a temperature range of at least 720° C. and at most 800° C. by a water cooling unit, the holding treatment holding the hot-rolled steel sheet for a period of at least Δt seconds defined by the following formula in a temperature range of at least 650° C. and at most 800° C., the secondary cooling treatment cooling the hot-rolled steel sheet to a temperature range of at least 400° C. and at most 650° C.; and coiling the hot-rolled steel sheet in a temperature range of at least 400° C. and at most 650° C., $$\Delta t(\text{second}) = 5 \cdot \text{Mn}^4 \quad (1)$$

where Mn in the formula (1) means a Mn content (unit: mass %) in steel,
- (B) a pickling step for subjecting the hot-rolled steel sheet produced by the hot rolling step to a pickling treatment; and
- (C) a continuous hot-dip galvanizing step comprising the steps of: heating the hot-rolled steel sheet produced by the pickling step to a temperature range of at least 650° C. and at most 800° C.; cooling and subjecting the hot-rolled steel sheet to a hot-dip galvanizing treatment; and holding the hot-rolled steel sheet in a temperature range of at least 460° C. and at most 600° C. to thereby subject the hot-rolled steel sheet to an alloying treatment.

\* \* \* \* \*